United States Patent [19]
Ridenour

[11] Patent Number: 6,158,518
[45] Date of Patent: Dec. 12, 2000

[54] HORSESHOE IDENTIFICATION SYSTEM AND METHOD

[76] Inventor: Robert G. Ridenour, 3343 Kaylor Rd., Lucas, Ohio 44843

[21] Appl. No.: 09/246,392

[22] Filed: Feb. 9, 1999

[51] Int. Cl.⁷ ....................................................... A01L 3/00
[52] U.S. Cl. ................................................ 168/4; 168/24
[58] Field of Search ............................ 168/4, 24, DIG. 1

[56] References Cited

U.S. PATENT DOCUMENTS

| | | | |
|---|---|---|---|
| 3,913,679 | 10/1975 | Bucalo | 168/24 |
| 4,346,762 | 8/1982 | Tovim | 168/4 |
| 5,129,461 | 7/1992 | Igrow | 168/4 |
| 5,421,415 | 6/1995 | Wells | 168/4 |

*Primary Examiner*—Peter M. Poon
*Assistant Examiner*—Elizabeth Shaw
*Attorney, Agent, or Firm*—David R. Percio; Daniel D. Wasil; Walker & Jocke

[57] ABSTRACT

A system and method for selecting a horseshoe for a horse comprises preparing a series of horseshoe sets, each set based on the requirements a horse may have for a specific horseshoe and uses to which a horse may be put. Each horseshoe (20, 30, 40, 50) is a distinctive color (22, 32) and/or pattern (42, 52). The color and/or pattern correlates to the requirements a horse may have for a specific horseshoe and the uses to which the horse may be put. A user determines the particular requirements a horse may have for a specific horseshoe and the uses to which a particular horse will be put, correlates the particular requirement or use to a color and/or pattern and selects a horseshoe or number of horseshoes.

22 Claims, 2 Drawing Sheets

HORSESHOE IDENTIFICATION SYSTEM AND METHOD

TECHNICAL FIELD

This invention relates to a system and method of selecting horseshoes. Specifically this invention relates to a system and method of selecting horseshoes by color coding the horseshoes to identify particular horseshoes intended for specific surfaces as well as to identify horse ownership or sponsorship.

BACKGROUND ART

Horseshoes have typically had the color of whatever material, usually steel or another a metal or metal alloy, they are made from. There are two different size designation systems. One follows a sequence: 1, 0, 00, 000 . . . , while the second follows a sequence 3, 4, 5 . . . Different surfaces may require horseshoes of different compositions for optimum performance of both the horse and the horseshoe. An entirely different kind of horseshoe material is desirable for a horse racing on a grass track as compared to a horse carrying a policeman on asphalt or concrete surfaces in the city. Further, horseshoes of different weights may be required in different situations. Between the two designation systems there are approximately 50 size, material and weight combinations. A single size horseshoe may have a different size designator from each system.

There are also corrective horseshoes designed and manufactured to overcome a physical defect or problem affecting one or more hooves of a horse. For example, a corrective horseshoe may have a wedge portion at a particular location to cause the hoof to turn inwardly or outwardly for proper anatomical alignment. Another corrective horseshoe, a mushroom bar horseshoe of the type shown in FIGS. 2 and 3 may be used for a damaged frog, navicular and sole. Another corrective horseshoe, an eggbar horseshoe of the types shown in FIG. 4 may be used for a damaged navicular, laminitis and cracks in the horn wall. Yet another corrective horseshoe, an eggbar heartbar of the types shown in FIGS. 5 and 6 are used for a damaged frog and a damaged sole. Still another corrective horseshoe, a straight bar, is shown in FIG. 7. The appropriate size, weight and material of a corrective horseshoe must be selected and used when a horse is reshod.

Riding stables provide different saddles, bridles and harnesses, known as "tack", for different horses. The stables must have knowledgeable staff to select the appropriate tack for different horses when getting them ready for patrons of the stable.

Jockeys wear different color riding outfits or silks for races to enable observers to better distinguish one horse from another during races. Observers watching a horse in a stable or corral without a jockey, blanket or other colors, may have difficulty identifying the stable or owner. Horses are often no longer generally visibly branded, and if they are the brands may be difficult to see or distinguish.

Horseshoes of the same material and weight are stored and used as needed. They may be sorted so that horseshoes of the same material and weight are stored together separate from those of different material and weight. Time and effort can be expended in sorting through randomly stored horseshoes for a matching set, particularly if horseshoes having both size designation systems are used. When fewer than all four horseshoes are changed, time and effort can be expended obtaining an appropriate match from among the stored horseshoes, especially if a corrective horseshoe is required.

Thus there exists a need for a system and method which permits quick, efficient and convenient determination of an appropriate horseshoe from between two different size designation systems, from a variety of corrective horseshoes, for a variety of surfaces, which permits determination of appropriate tack for a variety of horses, as well as for identifying the stable or owner of a horse which is not wearing the colors of the stable or owner.

DISCLOSURE OF INVENTION

It is an object of the present invention to provide a system and method for selecting horseshoes for particular uses.

It is a further object of the present invention to provide a system and method for selecting sizes of horseshoes appropriate for the surface on which a horse will travel.

It is a further object of the present invention to provide a system and method for reducing the chance of error in selecting sizes of horseshoes.

It is a further object of the present invention to provide a system and method for reducing the chance of error in selecting an appropriate corrective horseshoe.

It is a further object of the present invention to provide a system and method for color coding horseshoes to coordinate with the tack to be used for a particular horse.

It is a further object of the present invention to provide a system and method for color coding horseshoes which can be done quickly, efficiently and conveniently.

Further objects of the present invention will be made apparent in the following Best Mode For Carrying Out Invention and the appended claims.

The foregoing objects are accomplished in a preferred embodiment of the invention by a system and method for relating colors and/or patterns to identify different sizes and compositions of horseshoes. The color and/or pattern is used to select specific horseshoes for particular applications. Additionally storage locations for various sizes and types of horseshoes can be marked with the color and/or pattern to simplify the process of finding appropriate horseshoes.

In an alternative embodiment the color and/or pattern of horseshoes for race horses is coordinated with the tack and silks of the stable which owns the horse. Additionally horse owners may wish to coordinate their tack and horseshoes for identification. Horse owners may also wish to select certain colors to satisfy their own color preferences or color preferences of others riding their horses.

BEST MODE FOR CARRYING OUT INVENTION

Figure 1:
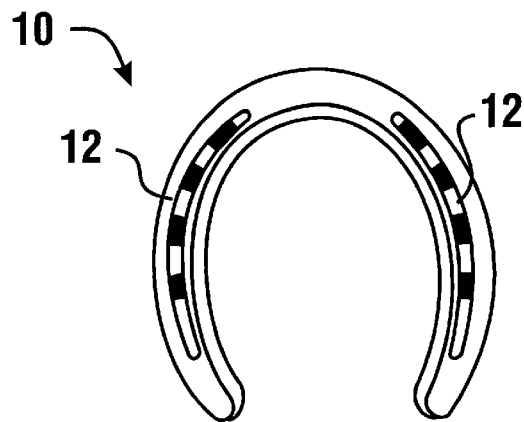
FIG. 1 is a plan view of a horseshoe the prior art, without the color and pattern of the present invention.
Figure 2:
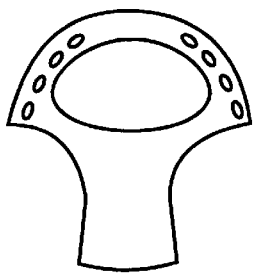
FIG. 2 is a front plan view of a mushroom bar corrective horseshoe of the prior art, without the color and pattern of the present invention.
Figure 3:
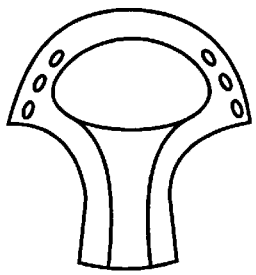
FIG. 3 is a rear plan view of a mushroom bar corrective horseshoe of the prior art, without the color and pattern of the present invention.
Figure 4:
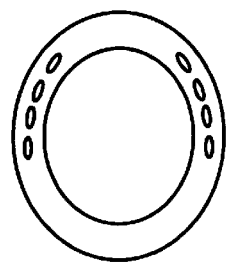
FIG. 4 is a plan view of an eggbar corrective horseshoe of the prior art, without the color and pattern of the present invention.
Figure 5:
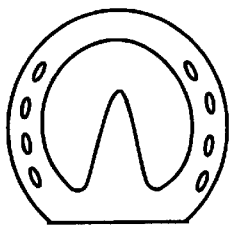
FIG. 5 is a plan view of an eggbar corrective horseshoe of the prior art, without the color and pattern of the present invention.
Figure 6:
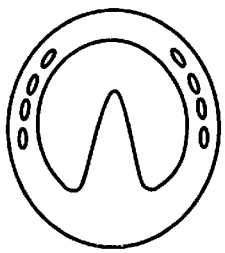
FIG. 6 is a plan view of an eggbar heartbar corrective horseshoe of the prior art, without the color and pattern of the present invention.
Figure 7:
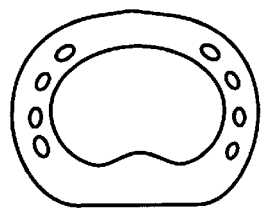
FIG. 7 is a plan view of a straight bar corrective horseshoe of the prior art, without the color and pattern of the present invention.

Referring now to the drawings and particularly to FIG. 1, there is shown therein a well known horseshoe of the prior art, generally indicated 10, having nail holes 12 therethrough. Horseshoes of the prior art are typically the color of whatever material, usually steel or another metal or metal alloy, from which they are made.

The weight and composition of a horseshoe is selected depending upon the use to which the horse will be put, and the same horseshoe may be identified by either of two different size designation systems. Different surfaces may require horseshoes of different compositions for optimum performance of both the horse and the horseshoe. For example, an entirely different kind of horseshoe material is desirable for a thoroughbred horse which is racing on a grass or dirt track as compared to a cow pony herding cattle in a corral or on a range, as further compared to a police horse on patrol on asphalt or concrete surfaces of a city. Further, horseshoes of different weights may be required for these and other applications. For a horse requiring corrective horseshoes designed and manufactured to overcome a physical defect or problem affecting one or more hooves the appropriate corrective horseshoe must be selected and used when a horse is reshod. Some typical corrective horseshoes of the prior art are shown in FIGS. 2–7.

Figure 8:
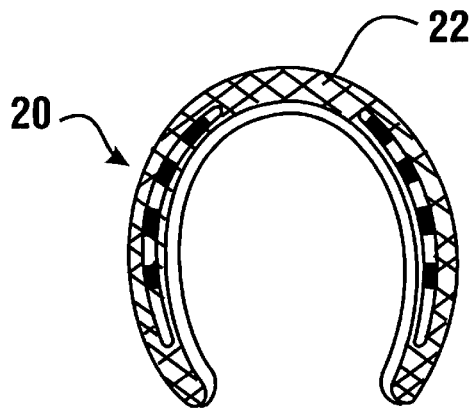
FIG. 8 is a plan view of a horseshoe of the present invention with cross-hatching indicating a first color.
Figure 9:
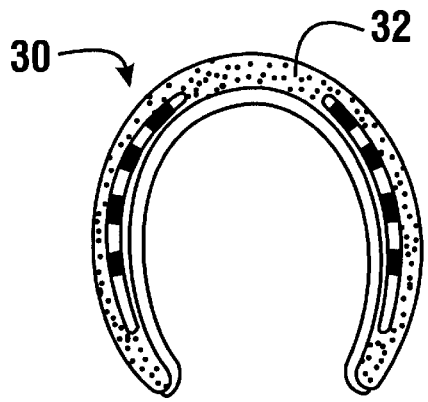
FIG. 9 is a plan view of a horseshoes of the present invention with pin dots indicating a second color.
Figure 10:
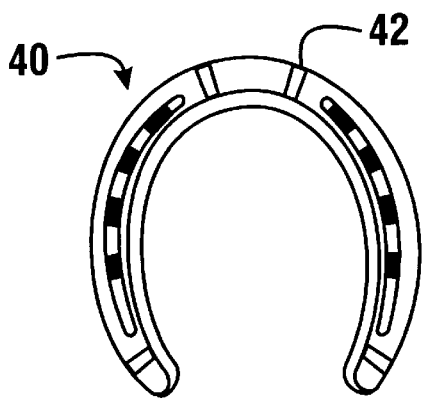
FIG. 10 is a plan view of a horseshoe of the present invention with spaced bars indicating a first pattern.
Figure 11:
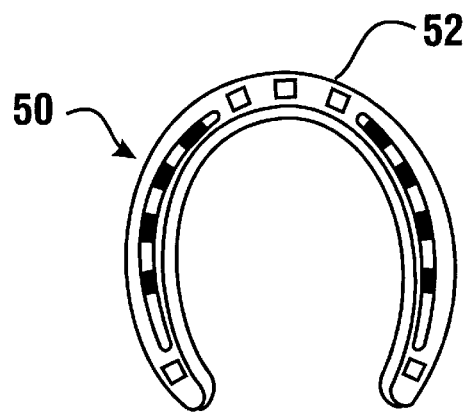
FIG. 11 is a plan view of a horseshoe of the present invention with rectangles indicating a second pattern.

In FIGS. 8 and 9 two different horseshoes 20,30 are shown with different colors 22, 32 represented by cross-hatching and pin dots respectively. Additional embodiments are shown in FIGS. 10 and 11 wherein two different horseshoes 40, 50 have different patterns 42,52 represented by spaced bars and rectangles respectively. As will be appreciated, any color or patter, or combination of colors and patterns may be used. The pattern and/or color must be clearly distinguishable and readily recognizable. The colors and patterns shown in FIGS. 8–11 can also readily be applied to horseshoes of other shapes, for example, such as those depicted in FIGS. 2–7.

By matching a color 22, 32 and/or pattern 42, 52, a set of four matching horseshoes may be quickly and easily obtained. Identical horseshoes identified by either of the different classification systems may be correctly selected. For a known color and/or pattern selected to represent a horseshoe suitable for a particular use, such as for an application like a police patrol horse for city streets, an appropriate set of four matching horseshoes may be quickly and easily obtained. Also, for a specific corrective need an appropriate corrective horseshoe may be properly selected.

In one application, a chart, diagram or listing may be used to indicate horseshoe size, material, weight and typical use. In another application a user may use a color and/or pattern to identify the stock in a stable, or even a herd, and use the same color and/or pattern for all the horseshoes, regardless of type.

Riding stables provide different saddles, bridles harnesses and other riding equipment, known as "tack", for different horses. The stables must have knowledgeable staff to select the appropriate tack for different horses when getting them ready for patrons of the stable. If a knowledgeable staff is too costly or not available due to a tight labor market, a less knowledgeable staff can select a horse then obtain the appropriate tack for saddling up by matching color identified tack with the color of the horseshoes on a selected horse. The tack could match or coordinate with the color and/or pattern of the tack, or alternatively the tack could be in a storage location marked with the color and/or pattern.

Stables may wish to present a "do-it-yourself" approach for patrons. Patrons not otherwise knowledgeable can select a horse then obtain the appropriate tack for saddling up themselves by matching color identified tack with the color of the horseshoes on a selected horse. The tack could match or coordinate with the color and/or pattern of the tack, or alternatively the tack could be in a storage location marked with the color and/or pattern.

Jockeys wear different color riding outfits or silks for races to enable observers to better distinguish one horse from another during races. Horses are often no longer generally visibly branded, and if they are, the brands may be difficult to see or distinguish, especially from a distance. Observers watching a horse in a stable or corral prior to a race without a jockey, blanket or other colors, may have difficulty identifying the stable or owner.

The system and method of the present invention includes the steps of preparing a plurality of sets of horseshoes. Each set has selected characteristics such as size, weight, and type of material. The horseshoes in each set have the same color and/or pattern. The color and/or pattern is a code which a user can easily, visually recognize as correlating the selected size, weight and type of material with a particular use to which a horse will be put. An alternative system and method involves correlating a selected corrective horseshoe with a particular horse requiring that horseshoe. Another alternative system and method involves correlating a set of tack with the color and/or pattern of horseshoes worn by a particular horse.

As will be appreciated by one skilled in the art, the system and method of the present invention may be used to correlate an appropriate horseshoe having a selected size, weight and type of material with a particular use to which a horse will be put. Further, the system and method of the present invention may be used to correlate particular tack with a selected color and/or pattern of a horseshoe. It may also be used to select certain colors to satisfy color preferences.

Thus the new horseshoe identification system and method of the present invention achieves the above stated objectives, eliminates difficulties encountered in the use of prior devices and systems, solves problems and attains the desirable results described herein.

In the foregoing description certain terms have been used for brevity, clarity and understanding, however, no unnecessary limitations are to be implied therefrom because such terms are for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means capable of performing the recited function, and shall not be limited to the structures shown herein or mere equivalents.

Having described the features, discoveries and principles of the invention, the manner in which it is constructed and operated, and the advantages and useful results attained, the new and useful structures, devices, elements, arrangements, parts, combinations, systems, equipment, operations and relationships are set forth in the appended claims.

I claim:

1. A method for selecting horseshoes for a horse comprising:

preparing a series of horseshoe sets, each set based on selected horseshoe characteristics;

coding each horseshoe set to correlate with the selected horseshoe characteristics;

determining the horseshoe requirements of the horse;

correlating the horseshoe requirements to a code;

selecting from the series of horseshoe sets a horseshoe with the correlated code.

2. The method of claim 1 wherein the code is color based.

3. The method of claim 1 wherein the code is pattern based.

4. The method of claim 2 wherein the horseshoe set comprises horseshoes of a selected size.

5. The method of claim 2 wherein the horseshoe set comprises horseshoes of a selected weight.

6. The method of claim 2 wherein the horseshoe set comprises horseshoes of a selected material.

7. The method of claim 2 wherein the horseshoe set comprises horseshoes of a selected corrective characteristic.

8. The method of claim 3 wherein the horseshoe set comprises horseshoes of a selected size.

9. The method of claim 3 wherein the horseshoe set comprises horseshoes of a selected weight.

10. The method of claim 3 wherein the horseshoe set comprises horseshoes of a selected material.

11. The method of claim 3 wherein the horseshoe set comprises horseshoes of a selected corrective characteristic.

12. A method for selecting horseshoes for a horse comprising:

preparing a series of horseshoe sets, each set based on the different uses to which a horse may be put;

coding each horseshoe set to correlate with the uses to which the horse may be put;

determining a selected use to which the horse will be put;

correlating the selected use to a code;

selecting from the series of horseshoe sets a horseshoe with the correlated code.

13. The method of claim 12 wherein the code is color based.

14. The method of claim 12 wherein the code is pattern based.

15. The method of claim 13 wherein the horseshoe set comprises horseshoes of a selected size.

16. The method of claim 13 wherein the horseshoe set comprises horseshoes of a selected weight.

17. The method of claim 13 wherein the horseshoe set comprises horseshoes of a selected material.

18. The method of claim 13 wherein the horseshoe set comprises horseshoes of a selected corrective characteristic.

19. The method of claim 14 wherein the horseshoe set comprises horseshoes of a selected size.

20. The method of claim 14 wherein the horseshoe set comprises horseshoes of a selected weight.

21. The method of claim 14 wherein the horseshoe set comprises horseshoes of a selected material.

22. The method of claim 14 wherein the horseshoe set comprises horseshoes of a selected corrective characteristic.

* * * * *